(12) United States Patent
Yoshida

(10) Patent No.: US 10,570,266 B2
(45) Date of Patent: Feb. 25, 2020

(54) SAPONIFIED ETHYLENE-VINYL ESTER COPOLYMER COMPOSITION PELLET, AND PRODUCTION METHOD THEREFOR

(71) Applicant: THE NIPPON SYNTHETIC CHEMICAL INDUSTRY CO., LTD., Osaka (JP)

(72) Inventor: Tomonori Yoshida, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/600,970

(22) Filed: May 22, 2017

(65) Prior Publication Data

US 2017/0253721 A1    Sep. 7, 2017

Related U.S. Application Data

(63) Continuation of application No. PCT/JP2015/084086, filed on Dec. 4, 2015.

(30) Foreign Application Priority Data

Dec. 5, 2014    (JP) ................................. 2014-247132

(51) Int. Cl.
   *C08K 3/00*    (2018.01)
   *C08K 3/34*    (2006.01)
   (Continued)

(52) U.S. Cl.
   CPC ................ *C08K 3/346* (2013.01); *B29B 7/48* (2013.01); *B29B 7/845* (2013.01); *B29C 48/39* (2019.02);
   (Continued)

(58) Field of Classification Search
   CPC .................................................... C08K 3/346
   See application file for complete search history.

(56) References Cited

U.S. PATENT DOCUMENTS

| 2002/0143098 A1 | 10/2002 | Kawai et al. |
| 2004/0198889 A1 | 10/2004 | Noma et al. |
| 2011/0178222 A1 | 7/2011 | Kani |

FOREIGN PATENT DOCUMENTS

| JP | H10-158412 A | 6/1998 |
| JP | 2000-191874 | 7/2000 |

(Continued)

OTHER PUBLICATIONS

European Search Report issued with respect to Application No. 15864654.7, dated May 11, 2018.

(Continued)

*Primary Examiner* — Arrie L Reuther
(74) *Attorney, Agent, or Firm* — Greenblum & Bernstein, P.L.C.

(57) ABSTRACT

An EVOH resin composition excellent in inorganic compound dispersibility and a method of producing an EVOH resin composition excellent in productivity and inorganic compound dispersibility are provided. The EVOH resin composition contains an EVOH resin (A) and an inorganic compound (B), and has a crystallinity of not lower than 36%. The EVOH resin composition is produced by: feeding an EVOH resin (A), an inorganic compound (B) and water (C) into a kneading apparatus including a screw-type side feeder (3); melt-kneading the resulting EVOH resin mixture while driving the screw-type side feeder (3); and expelling water vapor from the screw-type side feeder (3) to reduce the water content of the EVOH resin mixture to lower than 5 weight % while suppressing leakage of the EVOH resin kneaded body from the screw-type side feeder (3).

8 Claims, 1 Drawing Sheet

(51) Int. Cl.
  *C08L 29/04* (2006.01)
  *B29C 48/39* (2019.01)
  *B29C 48/40* (2019.01)
  *B29C 48/76* (2019.01)
  *C08J 3/205* (2006.01)
  *B29B 7/48* (2006.01)
  *B29B 7/84* (2006.01)
  *B29B 7/72* (2006.01)
  *B29B 7/90* (2006.01)
  *B29C 48/285* (2019.01)
  *C08K 7/14* (2006.01)
  *B29B 7/42* (2006.01)
  *C08K 3/26* (2006.01)
  *C08K 7/20* (2006.01)
  *C08K 3/22* (2006.01)
  *B29K 23/00* (2006.01)

(52) U.S. Cl.
  CPC ............ *B29C 48/40* (2019.02); *B29C 48/762* (2019.02); *C08J 3/2056* (2013.01); *C08L 29/04* (2013.01); *B29B 7/421* (2013.01); *B29B 7/483* (2013.01); *B29B 7/726* (2013.01); *B29B 7/90* (2013.01); *B29C 48/285* (2019.02); *B29K 2023/086* (2013.01); *C08J 2329/04* (2013.01); *C08K 3/22* (2013.01); *C08K 3/26* (2013.01); *C08K 7/14* (2013.01); *C08K 7/20* (2013.01)

(56) References Cited

FOREIGN PATENT DOCUMENTS

| | | |
|---|---|---|
| JP | 2002-3613 A | 1/2002 |
| JP | 2002-284887 A | 10/2002 |
| JP | 2002-293948 A | 10/2002 |
| JP | 2004-315793 A | 11/2004 |
| JP | 2006-052351 A | 2/2006 |
| JP | 2012-144675 A | 8/2012 |
| WO | 10/001471 A1 | 7/2010 |

OTHER PUBLICATIONS

International Search Report from PCT/JP2015/084086, dated Mar. 1, 2016.
International Preliminary Report on Patentability from PCT/JP2015/084086, dated Jun. 6, 2017.
JP OA issued in JP Patent App. No. 2015-559331, dated Oct. 15, 2019.

SAPONIFIED ETHYLENE-VINYL ESTER COPOLYMER COMPOSITION PELLET, AND PRODUCTION METHOD THEREFOR

RELATED APPLICATION

This application is a continuation of International Application No. PCT/JP2015/84086, filed on Dec. 4, 2015, which claims priority to Japanese Patent Application No. 2014-247132, filed on Dec. 5, 2014, the entire contents of each of which are hereby incorporated by reference.

TECHNICAL FIELD

The present disclosure relates to a composition of a saponified ethylene-vinyl ester copolymer (hereinafter referred to as "EVOH resin") containing an inorganic compound, and to a production method therefor. More specifically, the present disclosure relates to an EVOH resin composition excellent in productivity and inorganic compound dispersibility, and to a production method therefor.

BACKGROUND ART

EVOH resins are excellent in transparency, antistatic property, oil resistance, solvent resistance, gas barrier property, fragrance retention and the like. The EVOH resins are melt-formable/moldable thermoplastic resins, and are used as packaging materials for food packaging or other various packaging applications.

It is conventionally known that an inorganic compound is added to such a EVOH resin for improvement of various properties of the EVOH resin. Studies are conducted on a method of properly dispersing the inorganic compound in the EVOH resin.

For example, PTL 1 proposes a method of preparing an EVOH resin composition containing inorganic particles dispersed therein by feeding a hydrous EVOH resin having a water content of not lower than 0.5 weight % into an extruder, adding an aqueous dispersion of the inorganic particles to the hydrous EVOH resin melted in the extruder, kneading the resulting mixture at a relatively low temperature, and drying the resulting hydrous resin composition.

PTL 2 proposes a method of preparing an EVOH resin composition containing an inorganic compound dispersed therein by kneading a mixture of an EVOH resin having a water content of not higher than 70 weight % and an aqueous dispersion of the inorganic compound at a relatively high temperature while removing water from the mixture to reduce the water content to not higher than 5 weight %.

PTL 3 proposes a method of preparing an EVOH resin composition containing clay mineral dispersed therein by melting an EVOH resin containing dry clay mineral in an extruder, feeding a small amount of water to the EVOH resin while kneading the EVOH resin at a relatively high temperature, and dispersing the clay mineral in the EVOH resin by utilizing a gasified water.

PTL 4 proposes a method of preparing an EVOH resin composition containing a water-swellable layered inorganic compound dispersed therein by melt-kneading an EVOH resin having a water content of 25 to 50 weight % with a dry water-swellable layered inorganic compound at a relatively low temperature, and drying the resulting hydrous resin composition in a drying apparatus.

RELATED ART DOCUMENT

Patent Document

PTL 1: JP-A-2002-284887
PTL 2: JP-A-2006-52351
PTL 3: JP-A-HEI10(1998)-158412
PTL 4: JP-A-2000-191874

SUMMARY OF INVENTION

In the method of PTL 1, however, a drying step is additionally required for the preparation of the resin composition, because the water content of the resin composition is reduced by drying the hydrous EVOH resin composition after the kneading. Therefore, the method of PTL 1 has a problem with lower productivity.

In PTL 1, it is stated that, when a dry EVOH resin and the aqueous dispersion of the inorganic particles were blended together, sampling was impossible due to bubbling of water in Comparative Example 1. This indicates that, where an ordinary vent port is used for dehydration, the dehydration is insufficient.

In the method of PTL 2, water is removed from the mixture of the hydrous EVOH resin and the aqueous dispersion of the inorganic compound while the mixture is kneaded at the relatively high temperature. For the removal of water, a material feeding port or the like is opened to evaporate the water. Therefore, the method of PTL 2 has a problem with lower dehydration efficiency and lower productivity.

In the method of PTL 3, the dry clay mineral is blended and kneaded with the EVOH resin in the extruder. Therefore, the method of PTL 3 has a problem with poorer clay mineral dispersibility.

In the method of PTL 4, the dry water-swellable layered inorganic compound is blended and kneaded with the EVOH resin in an extruder, so that the dispersibility of the water-swellable layered inorganic compound is poorer. Further, the hydrous EVOH resin is melt-kneaded at a relatively low temperature and, therefore, a drying step is additionally required for removal of water from the resin composition. Therefore, the method of PTL 4 has a problem with lower productivity.

That is, the conventional methods described above have lower productivity, and fail to properly disperse the inorganic compound in the EVOH resin composition.

In view of the foregoing, the present disclosure is directed to an EVOH resin composition having excellent inorganic compound dispersibility, and to a method of producing an EVOH resin composition excellent in productivity and inorganic compound dispersibility.

As a result of intensive studies in view of the foregoing, the inventor found that the dispersibility of the inorganic compound in the EVOH resin composition is closely associated with the crystallinity of the EVOH resin composition. As a result of further studies based on the findings, the inventor found that, where the crystallinity of the EVOH resin composition is relatively increased, the dispersibility of the inorganic compound in the EVOH resin composition is improved and the productivity is also improved.

Further, the inventor found that the higher crystallinity EVOH resin composition can be prepared by feeding an EVOH resin (A), an inorganic compound (B) and water (C) into an extruder having a screw-type side feeder, melt-kneading the resulting EVOH resin mixture while driving the side feeder, expelling water vapor from the side feeder to reduce the water content of the EVOH resin mixture to lower than 5 weight % while suppressing leakage of the EVOH resin kneaded body from the side feeder in the melt kneading, whereby the aforementioned problems can be solved.

The EVOH resin compositions disclosed in PTL 1 and PTL 4 supposedly each have a lower crystallinity, because the EVOH resin compositions are crystallized in a highly hydrous state and, therefore, the crystallization of the EVOH resin compositions is inhibited by water.

In PTL 2, the material feeding port or the like is opened to evaporate the water and, therefore, water is present in an insufficient amount in a kneading portion, thereby reducing the dispersibility of the inorganic compound. Therefore, the crystallinity of the EVOH resin composition is supposedly low.

In PTL 3, the dry clay mineral is blended and kneaded with the EVOH resin. Since the dispersibility of the clay mineral is poorer, the crystallinity of the EVOH resin composition is supposedly low.

According to a first inventive aspect, there is provided a saponified ethylene-vinyl ester copolymer composition (EVOH resin composition), which contains an EVOH resin (A) and an inorganic compound (B), and has a water content of lower than 5 weight % and a crystallinity of not lower than 36%.

According to a second inventive aspect, the inorganic compound (B) is present in a proportion of 0.1 to 100 parts by weight based on 100 parts by weight of the EVOH resin (A) in the EVOH resin composition.

According to a third inventive aspect, there is provided an EVOH resin composition production method, which includes the steps of: feeding the EVOH resin (A), the inorganic compound (B) and water (C) into a kneading apparatus including a screw-type side feeder; and driving the screw-type side feeder and melt-kneading the resulting EVOH resin mixture to expel water vapor from the screw-type side feeder to reduce the water content of the EVOH resin mixture to lower than 5 weight % while suppressing leakage of the EVOH resin kneaded body from the screw-type side feeder, whereby an EVOH resin composition having a crystallinity of not lower than 36% is prepared.

According to a fourth inventive aspect, the screw-type side feeder is positioned downstream of a kneading portion of the kneading apparatus with respect to a material transport direction (positioned closer to an extrusion port) in the EVOH resin composition production method.

According to a fifth inventive aspect, the kneading apparatus further includes water expelling means provided downstream of the screw-type side feeder for expelling water from the saponified ethylene-vinyl ester copolymer kneaded body in the EVOH resin composition production method.

The inventive EVOH resin composition contains the EVOH resin (A) and the inorganic compound (B), and has a water content of lower than 5 weight % and a crystallinity of not lower than 36%. As described above, the dispersibility of the inorganic compound (B) in the EVOH resin composition is improved by increasing the crystallinity of the EVOH resin composition. Therefore, the inorganic compound (B) is properly dispersed in the inventive EVOH resin composition.

In the inventive EVOH resin composition production method, the EVOH resin composition having a crystallinity of not lower than 36% is produced by: feeding the EVOH resin (A), the inorganic compound (B) and water (C) into the kneading apparatus including the screw-type side feeder; and driving the screw-type side feeder and melt-kneading the resulting EVOH resin mixture to expel water vapor from the screw-type side feeder to reduce the water content of the EVOH resin mixture to lower than 5 weight % while suppressing the leakage of the EVOH resin kneaded body from the screw-type side feeder. Thus, the EVOH resin composition having excellent dispersibility of the inorganic compound (B) can be efficiently produced.

Where the screw-type side feeder is positioned downstream of the kneading portion of the kneading apparatus in the EVOH resin composition production method, the water vapor can be efficiently expelled from the EVOH resin kneaded body which is a precursor of the EVOH resin composition. Thus, the productivity of the inventive EVOH resin composition can be further improved.

Where the kneading apparatus further includes the water expelling means provided downstream of the screw-type side feeder for expelling water from the resulting saponified ethylene-vinyl ester copolymer kneaded body in the EVOH resin composition production method, the water vapor can be more efficiently expelled from the EVOH resin kneaded body which is the precursor of the EVOH resin composition. Thus, the productivity of the inventive EVOH resin composition can be still further improved.

DESCRIPTION OF EMBODIMENTS

Figure 1A:
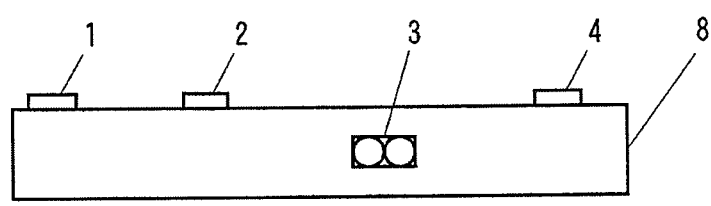
FIG. 1A is a side view showing the construction of a cylinder of a twin screw extruder (a first extruder to be used in one embodiment of the present disclosure)

The present disclosure will hereinafter be described in detail by way of preferred embodiments thereof. It should be understood that the present disclosure be not limited to these embodiments.

An inventive EVOH resin composition contains an EVOH resin (A) and an inorganic compound (B), and has a water content of lower than 5 weight % and a crystallinity of not lower than 36%.

In a method of producing the EVOH resin composition, an EVOH resin (A), an inorganic compound (B) and water (C) are melt-kneaded in an extruder including a screw-type side feeder, while the side feeder is driven. Thus, water vapor is expelled from the side feeder to reduce the water content of the resulting EVOH resin mixture to lower than 5 weight % while the EVOH resin kneaded body is substantially prevented from leaking from the side feeder in the melt kneading.

<EVOH Resin (A)>

The EVOH resin (A) to be used in the present disclosure is a water-insoluble thermoplastic resin typically prepared by saponifying a copolymer of ethylene and a vinyl ester monomer (an ethylene-vinyl ester copolymer). For example, solution polymerization, suspension polymerization or emulsion polymerization may be employed for the preparation of the EVOH resin (A). Solution polymerization using methanol as a solvent is generally employed.

The EVOH resin (A) thus prepared mainly contains a structural unit derived from ethylene and a structural unit derived from vinyl alcohol, and a small amount of a vinyl ester structural unit remaining unsaponified.

A typical example of the vinyl ester monomer is vinyl acetate which is advantageous in terms of commercial availability and impurity treatment efficiency in the production process. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate and vinyl versatate, and aromatic vinyl esters such as vinyl benzoate, among which typically C3 to C20 aliphatic vinyl esters, preferably C4 to C10 aliphatic vinyl esters, particularly preferably C4 to C7 aliphatic vinyl esters are used. These vinyl ester monomers are generally each used alone, but may be used in combination as required.

The EVOH resin (A) typically has an ethylene structural unit content of 20 to 60 mol %, preferably 25 to 50 mol %, particularly preferably 25 to 35 mol %, as measured in conformity with ISO14663. If the ethylene structural unit content is excessively low, the gas barrier property in a higher humidity environment and the melt-formability/moldability tend to be poorer. If the ethylene structural unit content is excessively high, on the other hand, the gas barrier property tends to be poorer.

The saponification degree of the vinyl ester structural unit in the EVOH resin (A) is typically 90 to 100 mol %, preferably 95 to 100 mol %, particularly preferably 99 to 100 mol %, as measured in conformity with JIS K6726 (with the use of a solution obtained by homogeneously dissolving the EVOH resin (A) in a water/methanol solvent). If the saponification degree is excessively low, the gas barrier property, the heat stability, the moisture resistance and the like tend to be poorer.

The EVOH resin (A) typically has a melt flow rate (MFR) of 0.5 to 100 g/10 minutes, preferably 1 to 50 g/10 minutes, particularly preferably 3 to 35 g/10 minutes, as measured at 210° C. with a load of 2,160 g. If the MFR is excessively great, the film formability tends to be unstable. If the MFR is excessively small, the melt-extrusion tends to be difficult with an excessively high viscosity.

In the present disclosure, the EVOH resin (A) preferably has a water content of not higher than 60 weight % (preferably not higher than 40 weight %, more preferably not higher than 20 weight %, particularly preferably lower than 5 weight %, especially preferably not higher than 0.5 weight %) in the production of the intended EVOH resin composition. If the water content is excessively high, the dehydration is liable to be insufficient, so that the water vapor will flow back into a hopper due to bubbling of water. This may result in adhesion of the resin in the hopper, making it impossible to properly feed the ingredients. The lower limit of the water content is not particularly defined, but is typically 0.01 weight %.

Exemplary methods for allowing the EVOH resin (A) to contain water include a method in which the EVOH resin (A) is precipitated from a solution thereof in water and sufficiently rinsed with water for removal of a solvent to be thereby allowed to contain water, a method in which the EVOH resin (A) is treated in pressurized hot water for about 1 to about 3 hours, and a method in which the EVOH resin (A) is precipitated in water from a paste obtained after the saponification to be thereby allowed to contain water in the production of the EVOH resin (A) (see, for example, JP-A-2002-003611). Of these methods, the method in which the EVOH resin (A) is precipitated in water from the paste obtained after the saponification in the production of the EVOH resin (A) is preferably used.

Before the EVOH resin (A) is melt-kneaded with the inorganic compound (B) and the water (C) after the water content of the EVOH resin (A) is adjusted by any of the aforementioned methods, the EVOH resin (A) may be dried (by a hot air drying method, an inductive heating drying method, a microwave irradiation drying method or the like) for the adjustment (readjustment) of the water content of the EVOH resin (A), or water adhering to surfaces of pellets of the EVOH resin (A) may be preliminarily removed. This is advantageous for kneading stability.

The EVOH resin (A) to be used in the present disclosure may further contain a structural unit derived from any of the following comonomers in addition to the ethylene structural unit and the vinyl alcohol structural unit (and the unsaponified vinyl ester structural unit). The comonomers include: propylene, isobutene; α-olefins such as α-octene, α-dodecene and α-octadecene; hydroxyl group-containing α-olefins such as 3-buten-1-ol, 4-penten-1-ol and 3-butene-1,2-diol, and hydroxyl group-containing α-olefin derivatives such as esterification products and acylation products of these hydroxyl group-containing α-olefins; unsaturated carboxylic acids, and salts, partial alkyl esters, complete alkyl esters, nitriles, amides and anhydrides of the unsaturated carboxylic acids; unsaturated sulfonic acids and salts of the unsaturated sulfonic acids; vinylsilane compounds; vinyl chloride; and styrene.

Post-modified EVOH resins such as urethanized, acetalized, cyanoethylated, oxyalkylenated EVOH resins are also usable.

Of the aforementioned modification products, EVOH resins containing a primary hydroxyl group incorporated in a side chain thereof by copolymerization are particularly preferred for proper secondary formability in a drawing process and a vacuum/pressure forming process. Particularly, an EVOH resin having a 1,2-diol structure in its side chain is preferred.

The EVOH resin (A) to be used in the present disclosure may contain additives which are generally added to the EVOH resin, as long as the effects of the present disclosure are not impaired. Examples of the additives include a heat stabilizer, an antioxidant, an antistatic agent, a colorant, a UV absorber, a lubricant, a plasticizer, a light stabilizer, a surfactant, an antibacterial agent, a drying agent, an antiblocking agent, a flame retardant, a crosslinking agent, a curing agent, a blowing agent, a nucleating agent, an antifogging agent, a biodegradation agent, a silane coupling agent and an oxygen absorbing agent.

The heat stabilizer may be preliminarily added in a small amount to the EVOH resin (A) for improvement of heat stability and other physical properties of the EVOH resin (A) in a melt-forming/molding process. Examples of the heat stabilizer include: organic acids such as acetic acid, propionic acid, butyric acid, lauric acid, stearic acid, oleic acid and behenic acid, and alkali metal salts (sodium salts, potassium salts and the like), alkali earth metal salts (calcium salts, magnesium salts and the like) and zinc salts of these organic acids; and inorganic acids such as sulfuric acid, sulfurous acid, carbonic acid, phosphoric acid and boric acid, and alkali metal salts (sodium salts, potassium salts and the like), alkali earth metal salts (calcium salts, magnesium salts and the like) and zinc salts of these inorganic acids.

The EVOH resin (A) to be used in the present disclosure may be a mixture with other type of EVOH resin. Examples of the other type of EVOH resin include EVOH resins having a different ethylene content, a different saponification degree, a different polymerization degree, a different comonomer unit and/or a different 1,2-diol structural unit content.

<Inorganic Compound (B)>

The inorganic compound (B) to be used in the present disclosure will be described.

The inorganic compound (B) is dispersible in water. Examples of the water-dispersible inorganic compound include glass fillers such as glass fibers, glass flakes and glass beads, and zeolite, calcium carbonate, alumina, titanium oxide, silicon dioxide, potassium titanate, wollastonite, zinc oxide, barium sulfate, carbon fibers and an layered inorganic compound, which may be used alone or in combination.

The layered inorganic compound is preferably used for improvement of the barrier property of the EVOH resin (A). The layered inorganic compound has a structure such that sheet-like structural portions each containing atoms densely arranged and strongly bonded to each other by covalent bonds or the like are stacked one on another in generally parallel relation by a van der Waals force or an electrostatic force. Examples of the layered inorganic compound include talc, mica, kaolinite, montmorillonite and vermiculite. The layered inorganic compound may be a natural layered inorganic compound or a synthetic layered inorganic compound.

Kaolinite is desirably used from the viewpoint of costs and availability.

Exemplary kaolinite to be used in the present disclosure typically has an average particle diameter (μm) of not greater than 30 μm, preferably not greater than 20 μm, particularly preferably not greater than 10 μm. The lower limit of the average particle diameter is typically 10 nm. If the average particle diameter is excessively great, dispersion stability in the aqueous dispersion tends to be reduced, and a product formed/molded from the resulting EVOH resin composition tends to have a poorer appearance.

Exemplary kaolinite to be used in the present disclosure typically has a surface area (B.E.T.$m^2$/g) of not less than 1 B.E.T.$m^2$/g, preferably not less than 3 B.E.T.$m^2$/g, particularly preferably not less than 5 B.E.T.$m^2$/g. In this case, the upper limit of the surface area is typically 80 B.E.T.$m^2$/g. If the surface area is excessively small, dispersion stability in the aqueous dispersion tends to be reduced.

Exemplary kaolinite to be used in the present disclosure may be surface-treated with a reactive agent such as a silane coupling agent. The silane coupling agent is represented by a general formula $RSiX_3$, wherein R is an organic functional group such as a vinyl group, a styryl group, an epoxy group, a glycidyl group, a glycidoxy group, a methacryl group, an amino group or a mercapto group, and X is mainly chlorine or an alkoxy group. Examples of the silane coupling agent include aminosilane, vinylsilane, styrylsilane, epoxysilane, glycidylsilane, glycidoxysilane, methacrylsilane and mercaptosilane, among which aminosilane is preferred. Specific examples of the silane coupling agent include vinyltrimethoxysilane, vinyltriethoxysilane, p-styryltrimethoxysilane, 2-(3,4-epoxycyclohexyl)ethyltrimethoxysilane, 3-glycidyloxypropyltrimethoxysilane, 3-glycidoxypropylmethyldiethoxysilane, 3-methacryloxypropylmethyldimethoxysilane, 3-aminopropyltrimethoxysilane, N-2-(aminoethyl)-3-aminopropylmethyldimethoxysilane and 3-mercaptopropyltrimethoxysilane.

<Water (C)>

Examples of the water (C) to be used in the present disclosure include distilled water, deionized water and tap water.

The EVOH resin (A), the inorganic compound (B) and the water (C) are preferably blended together by first preparing an aqueous dispersion of the inorganic compound (B) and then blending the inorganic compound aqueous dispersion with the EVOH resin (A) for homogenously dispersing the inorganic compound (B) in the EVOH resin composition.

Exemplary methods are as follows:

(1) A mixture prepared by blending the EVOH resin (A) and the aqueous dispersion of the inorganic compound (B) is fed into the extruder;

(2) The EVOH resin (A) and the aqueous dispersion of the inorganic compound (B) are directly fed into the extruder; and (3) The EVOH resin (A) is first fed into the extruder and melted, and then the aqueous dispersion of the inorganic compound (B) is fed into the extruder. In the method (3), the aqueous dispersion may be fed into the extruder by utilizing the gravity or by applying a pressure to the aqueous dispersion.

The aqueous dispersion of the inorganic compound (B) may be prepared with stirring by a stirrer. For improvement of the dispersibility, a high pressure dispersing apparatus such as an ultrahigh pressure homogenizer, a ball mill, an ultrasonic processing apparatus or the like may be used.

The aqueous dispersion of the inorganic compound (B) typically has a solid concentration of 1 to 90 weight %, preferably 3 to 80 weight %, more preferably 5 to 70 weight %. If the solid concentration is excessively low, a greater amount of the aqueous dispersion will be required in feeding the inorganic compound, making it difficult to increase the concentration of the inorganic compound (B) in the EVOH resin composition. If the feed amount of the aqueous dispersion is increased, the drying in the extruder is liable to be insufficient. If the extrusion rate of the EVOH resin composition is reduced, the productivity will be reduced. If the solid concentration is excessively high, the dispersibility of the inorganic compound (B) in the EVOH resin composition tends to be poorer. Further, the dispersion tends to have an increased viscosity and a reduced fluidity, so that the dispersion cannot be easily fed into the extruder.

<EVOH Resin Composition Production Method>

In the inventive production method, as described above, the EVOH resin composition having a crystallinity of not lower than 36% is prepared by: feeding the EVOH resin (A), the inorganic compound (B) and the water (C) into the extruder including the screw-type side feeder; driving the side feeder and melt-kneading the resulting EVOH resin mixture to expel water vapor from the side feeder to reduce the water content of the resulting EVOH resin mixture to lower than 5 weight % while suppressing the leakage of the EVOH resin kneaded body from the side feeder in the melt-kneading. The melt-kneading will hereinafter be described.

In the present disclosure, the EVOH resin (A), the inorganic compound (B) and the water (C) are mixed together before being kneaded together. The resulting resin mixture preferably has a water content of 1 to 90 weight % (preferably 2 to 80 weight %, more preferably 3 to 70 weight %) as a whole. If the water content is excessively low, the dispersibility of the inorganic compound (B) in the EVOH resin composition tends to be reduced. If the water content is excessively high, on the other hand, a greater amount of the aqueous dispersion will be required in feeding the inorganic compound (B), making it difficult to increase the concentration of the inorganic compound (B) in the EVOH resin composition. If the feed amount of the aqueous dispersion is increased, the drying in the extruder is liable to be insufficient. If the extrusion rate of the EVOH resin composition is reduced, the productivity tends to be reduced.

The proportion (solid proportion) of the inorganic compound (B) to be blended with the EVOH resin (A) is preferably 0.1 to 100 parts by weight, more preferably 0.1 to 50 parts by weight, particularly preferably 0.5 to 20 parts by weight, especially preferably 1 to 15 parts by weight, based on 100 parts by weight of the EVOH resin (A) (solid proportion).

If the proportion of the inorganic compound (B) is excessively small, the gas barrier property improving effect tends to be lower. If the proportion of the inorganic compound (B) is excessively great, a product such as a film formed/molded from the resulting EVOH resin composition tends to have a poorer appearance.

In the present disclosure, the blending proportions (mixing proportions) of the EVOH resin (A) and the inorganic compound (B) are first determined as intended, and then the water content of the EVOH resin (A) and the solid concentration of the inorganic compound (B) in the aqueous dispersion to be used for the kneading are determined in consideration of the water content of the entire resin mixture during the mixing.

The EVOH resin (A), the inorganic compound (B) and the water (C) can be kneaded together by an ordinary method with the use of a kneading apparatus such as an extruder, a kneader, a mixing roll, a Banbury mixer, a Plast mill and a Brabender mixer. These kneading apparatuses may be used alone or in combination.

The apparatus to be used may be properly selected depending on the types, the properties and the shapes of the EVOH resin (A) and the inorganic compound (B). In general, an extruder such as a single screw extruder or a twin screw extruder which is industrially widely used is preferably employed. Particularly, the twin screw extruder is preferred from the viewpoint of the dispersibility of the inorganic compound in the resin.

Figure 1B:
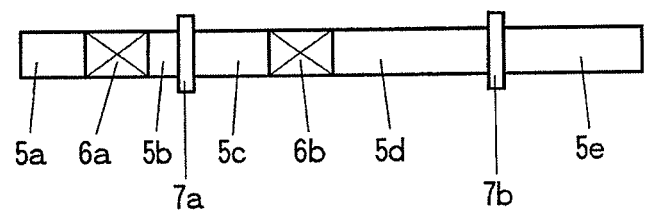
FIG. 1B is a side view showing the construction of screws (screw construction I) of the twin screw extruder (the first extruder to be used in the one embodiment of the present disclosure).

Referring to FIGS. 1A and 1B, the melting and the kneading of the EVOH resin (A) and the inorganic compound (B) in the twin screw extruder will hereinafter be described more specifically.

The twin screw extruder includes a cylinder, and screws provided in the cylinder. For easy description of one embodiment of the present disclosure, the cylinder and the screws (screw construction I) are respectively shown in FIGS. 1A and 1B. The EVOH resin (A) is fed from a material feeding portion 1 of the twin screw extruder. The fed EVOH resin (A) is transported downstream (rightward in FIGS. 1A and 1B) by a full-flight screw portion 5a while being heated by a barrel (not shown). Thus, the EVOH resin (A) is kneaded into a melted state or a half-melted state in a kneading portion 6a. The melted or half-melted resin is further transported through a seal ring 7a to a full-flight screw portion 5c by a full-flight screw portion 5b, and then the aqueous dispersion of the inorganic compound (B) is added to the resin from a dispersion pressure-injection portion 2. Then, the EVOH resin (A) and the aqueous dispersion of the inorganic compound (B) are transported to a kneading portion 6b and kneaded, and then further transported to a full-flight screw portion 5d. After water vapor is released from a screw-type side feeder 3, the EVOH resin (A) and the aqueous dispersion of the inorganic compound (B) are transported through a seal ring 7b to a full-flight screw portion 5e. Water vapor is further released from a vacuum vent 4, whereby the water content of a mixture of the EVOH resin (A) and the aqueous dispersion of the inorganic compound (B) is adjusted. Then, the resulting EVOH resin composition is extruded from an extrusion port 8.

The seal ring 7a serves to prevent water from flowing back upstream (leftward in FIGS. 1A and 1B), and the seal ring 7b serves to prevent water from leaking downstream. These seal rings 7a, 7b may be obviated, if the kneading portions 6a, 6b are filled with the mixture to ensure stable production. If water flows back upstream, the EVOH resin (A) will adhere to be agglomerated in the material feeding portion 1. This will make it impossible to stably feed the EVOH resin (A) as the material. If the water leaks downstream, the resulting EVOH resin composition is liable to have a higher water content, thereby suffering from foaming or other inconveniences in the melt-forming/molding process (an extrusion process, an injection molding process or the like) after the drying.

In the present disclosure, the screw-type side feeder 3 is provided downstream of the material feeding portion 1 of the extruder, and serves to evaporate away the liquid contained in the material and forcibly push back the material into the extruder when the material rises together with the liquid from the extruder in a process in which the material fed from the material feeding portion 1 is heated, melted and extruded from an opening at a distal end of the extruder.

Therefore, the screw-type side feeder 3 preferably includes twin screws rotatable in the same direction for constantly reliably pushing back the material into the extruder.

The inner diameter of the screw-type side feeder 3 is desirably equal to or smaller than the inner diameter of the extruder. A difference in the inner diameter between the screw-type side feeder 3 and the extruder is desirably not greater than 15 mm.

The screw-type side feeder 3 is connected to a hole formed in a side surface of the extruder. Therefore, it is virtually impossible to increase the inner diameter of the screw-type side feeder 3 to greater than the inner diameter of the extruder. An excessively small inner diameter of the screw-type side feeder 3 is not preferred because the water vapor expelling rate is reduced.

The rotation speed of the screw-type side feeder 3 is desirably not lower than 10 rpm (more desirably not lower than 30 rpm). If the rotation speed is excessively low, the resin is more liable to flow back.

The screw-type side feeder 3 desirably has a length-to-inner diameter ratio L/D of not less than 3. If the L/D ratio is excessively small, the screw surface area of the screw-type side feeder 3 is reduced. Therefore, the water vapor is liable to be condensed and accumulated, so that the expelling efficiency tends to be reduced.

The screw-type side feeder 3 may include a heating device such as a hot water jacket or a heater for heating the feeder. For improvement of the water vapor expelling efficiency, the heating device is desirably provided. For further improvement of the water vapor expelling efficiency, the screw-type side feeder 3 may be connected to a deaeration promoting apparatus such as a vacuum pump.

For the removal of water, the cylinder may include dehydration means such as a vent, a slit barrel, a drain port and a drain pump.

These dehydration means may be each used alone, or the same type or different types of dehydration means may be used in combination. For example, the dehydration can be reasonably achieved by removing water with the use of the screw-type side feeder 3 and further removing water through a vent port provided downstream of the screw-type side feeder 3.

The twin screw extruder to be used in the present disclosure preferably has an inner diameter of not less than 20 mm (more preferably 30 to 150 mm). If the inner diameter is excessively small, the productivity tends to be reduced.

The twin screw extruder preferably has an L/D ratio of not less than 20 (more preferably not less than 30). If the L/D ratio is excessively small, the kneading period will be reduced, so that the dispersibility of the inorganic compound (B) in the EVOH resin (A) tends to be poorer.

Not by way of limitation, a die provided at the outlet of the extruder preferably has 1 to 100 round holes (more preferably 3 to 50 round holes) each having a diameter of 1 to 7 mm (more preferably 2 to 5 mm) for productivity in order to produce resin composition pellets each having a proper shape and size (in order to produce cylindrical resin composition pellets each having a diameter of 1 to 10 mm and a length of 1 to 10 mm (more preferably a diameter of 2 to 6 mm and a length of 2 to 6 mm).

Further, one or more mesh screens (particularly preferably two or more mesh screens) are preferably provided between the extruder and an inlet of the die for removal of foreign matter and for stabilization of the pressure of the resin (for stabilization of the extrusion). In consideration of the stability of the extrusion, a gear pump, a heat exchanger and the like are preferably provided between the extruder and the inlet of the die.

When the EVOH resin (A), the inorganic compound (B) and the water (C) are fed into the twin screw extruder, the aqueous dispersion of the inorganic compound is preferably preliminarily prepared, and then blended with the EVOH resin for homogeneously dispersing the inorganic compound in the EVOH resin.

Exemplary methods are as follows:
(1) A mixture prepared by blending the EVOH resin (A) and the aqueous dispersion of the inorganic compound (B) is fed into a hopper of the extruder;
(2) The EVOH resin (A) and the aqueous dispersion of the inorganic compound (B) are directly fed into the hopper of the extruder; and
(3) The EVOH resin (A) is fed into the hopper of the extruder and, at the same time, the aqueous dispersion of the inorganic compound (B) is fed into a part of the barrel of the extruder (side feeding method). In the method (3), the aqueous dispersion may be fed from the vent port by utilizing the gravity or by applying a pressure to the aqueous dispersion.

Thus, the EVOH resin (A), the inorganic compound (B) and the water (C) are kneaded in the twin screw extruder. One feature of the present disclosure is that the EVOH resin (A) and the inorganic compound (B) are kneaded in the presence of the water (C) for the improvement of the dispersibility of the inorganic compound (B) in the EVOH resin. At this time, it is necessary to remove water from the resulting EVOH resin mixture through the screw-type side feeder 3 during the kneading.

Therefore, the screw-type side feeder 3 is preferably provided downstream of the kneading portion 6b in which the EVOH resin (A) and the inorganic compound (B) are kneaded together after the aqueous dispersion of the inorganic compound (B) is fed from the dispersion pressure-injection portion 2.

Figure 2A:
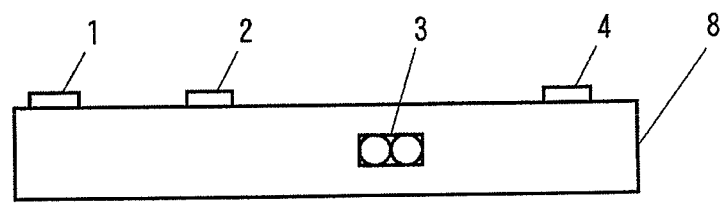
FIG. 2A is a side view showing the construction of a cylinder of a twin screw extruder (a second extruder to be used in another embodiment of the present disclosure)
Figure 2B:
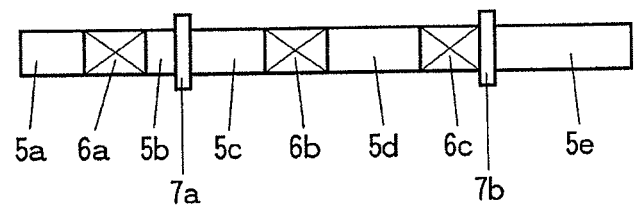
FIG. 2B is a side view showing the construction of screws (screw construction II) of the twin screw extruder (the second extruder to be used in the another embodiment of the present disclosure).

If the water content of the EVOH resin kneaded body present in the resin kneading portion 6b is excessively high, on the other hand, the viscosity of the EVOH resin kneaded body is reduced and, therefore, a stress to be applied to the EVOH resin mixture by the twin screws is liable to be reduced to thereby reduce the dispersion efficiency. Therefore, it is also preferred to provide an additional kneading portion 6c downstream of the kneading portion 6b as shown in FIGS. 2A and 2B so that the EVOH resin mixture can be kneaded after the water content thereof is reduced to increase the viscosity thereof by the screw-type side feeder 3.

The twin screw extruder having the additional kneading portion 6c will be described with reference to FIGS. 2A and 2B. FIG. 2A illustrates a cylinder of the twin screw extruder, which is the same as the cylinder shown in FIG. 1A. FIG. 2B shows screws (screw construction II) provided in the cylinder. The twin screw extruder has substantially the same construction as that shown in FIGS. 1A and 1B, except that the kneading portion 6c is additionally provided between a portion of the screw construction associated with the screw-type side feeder 3 and the seal ring 7b in FIG. 1B as described above. Like components are designated by like reference characters.

The screw-type side feeder 3 is preferably provided downstream of a screw element capable of suppressing the backflow of water to suppress inconveniences associated with the water backflow.

Exemplary methods for suppressing the water backflow are as follows:
(1) A screw element such as a seal ring having a blocking effect is used;
(2) A kneading portion is provided; and
(3) The retention time of the EVOH resin kneaded body is increased, for example, by reducing a screw pitch of the full-flight screw portion. Thus, the percentage of filling with the EVOH resin kneaded body is improved to block the water by the EVOH resin kneaded body itself.

In order to prevent the water from leaking downstream, the screw-type side feeder 3 may be provided upstream of a screw element capable of preventing the leakage of water.

That is, the screw-type side feeder 3 is desirably provided between screw elements, such as the seal rings, the kneading portions and the smaller-pitch full-flight screw portion, having the water blocking effect.

At least one screw-type side feeder 3 may be provided, and may be vacuum fed.

Dehydration means such as a vent may be used in combination with the screw-type side feeder 3. In this case, the vent is preferably provided downstream of the screw-type side feeder 3 for prevention of the vent-up of the resin kneaded body.

The temperature of the resin kneaded body in the die during the extrusion is not particularly limited, but is preferably adjusted at 120° C. to 300° C. (more preferably 150° C. to 280° C.) by controlling extrusion conditions (a setting temperature, a screw shape, a screw rotation speed and the like). If the temperature is excessively low, the extrusion is liable to be unstable. On the other hand, an excessively high temperature is not preferred, because the quality of the resin kneaded body is lowered (due to thermal degradation).

The temperature of the resin kneaded body may be defined as a temperature measured by a temperature sensor provided in the cylinder of the extruder. It is suitable to provide the temperature sensor in the vicinity of the extrusion port 8 at the distal end of the extruder.

The screw rotation speed is preferably selected from a range of 10 to 1000 rpm (more preferably 30 to 600 rpm). If the rotation speed is excessively low, the drying capability tends to be reduced. If the rotation speed is excessively high, the quality of the resin kneaded body tends to be lowered (due to thermal degradation).

The feed rate of the EVOH resin (A) may be properly determined according to the diameter of the barrel of the extruder. The feed rate of the inorganic compound (B) may be determined according to the feed rate of the EVOH resin (A) and the proportion of the inorganic compound (B) to be blended in the intended resin composition.

The retention time (kneading period) of the resin kneaded body in the extruder is typically selected from a range of 10 to 300 seconds, preferably 50 to 300 seconds, more preferably 100 to 300 seconds. If the retention time is excessively short, the kneading tends to be insufficient, thereby reducing the dispersibility of the inorganic compound (B) and the dehydration efficiency. If the retention time is excessively long, the resin is liable to be thermally deteriorated.

The pressure to be applied to the resin kneaded body (resin pressure) is preferably selected from a range of 0.5 to 30 MPa, more preferably 1 to 20 MPa. If the pressure is excessively low or high, the extrusion tends to be unstable. For prevention of the thermal degradation of the resin kneaded body, the inside of the hopper and the periphery of the vent are preferably sealed with nitrogen gas.

The resin composition has a water content of lower than 5 weight %, preferably not higher than 2 weight %, more preferably not higher than 0.5 weight %, immediately after being extruded from the extruder, in order to suppress the foaming and other inconveniences in the melt-forming/molding process (the extrusion process, the injection molding process or the like) after the drying. The lower limit of the water content is typically 0.01 weight %.

The water content of the resin composition is determined in the following manner. More specifically, the weight of the resin composition is measured after a heat treatment, and the water content is calculated based on the measurement results.

(Measurement Method)

An aluminum cup is weighed, and 10 g of the resin composition is put in the aluminum cup. Then, the weight of the aluminum cup containing the resin composition is measured. The aluminum cup containing the resin composition is heat-treated at 150° C. for 5 hours in a drying machine (SAFETY OVEN SPH-100 commercially available from ESPEC Corporation) having an inside atmosphere neither replaced with nitrogen nor drawn to vacuum. After the heat treatment, the aluminum cup containing the resin composition is taken out of the drying machine, and allowed to stand still for 30 minutes in a desiccator provided with a desiccant. The weight of the aluminum cup containing the heat-treated resin composition is measured.

$$WC=(W_B-W_A)/(W_B-W_C)\times 100 \quad \text{(Calculation Method)}$$

wherein WC is the water content (weight %), $W_B$ is the weight of the aluminum cup containing the resin composition before the heat treatment, $W_A$ is the weight of the aluminum cup containing the resin composition after the heat treatment, and $W_C$ is the weight of the aluminum cup.

After the resin composition having a water content of lower than 5 weight % is prepared by the aforementioned method, the resin composition may be further subjected to a drying process (a hot air drying process, an inductive heating drying process, a microwave irradiation drying process or the like) for the readjustment of the water content of the resin composition.

Thus, the intended resin composition having a crystallinity of not lower than 36% is produced. A major feature of the present disclosure is that, in order to control the crystallinity in the extruder provided with the screw-type side feeder 3, the resin mixture is melt-kneaded with the screw-type side feeder 3 being driven, thereby expelling water vapor from the screw-type side feeder 3 while suppressing leakage of the resin kneaded body from the screw-type side feeder 3.

The resin composition thus produced has a crystallinity of not lower than 36%, preferably not lower than 37%, particularly preferably not lower than 40%. The resin composition having such a crystallinity is advantageous in that the foaming and other inconveniences can be suppressed in the melt-forming/molding process (the extrusion process, the injection molding process or the like) after the drying. The upper limit of the crystallinity is typically 80%.

The crystallinity is defined as a weight ratio of a crystalline portion (X) to the total of the crystalline portion (X) and an amorphous portion (Y) of the resin composition.

The crystallinity is determined in the following manner. Diffraction data is obtained by irradiating the resin composition with X-ray by X-ray diffractometry, and divided into a scattering region attributable to the amorphous portion and a scattering region attributable to the crystalline portion. Then, the ratio of a crystalline scattering intensity to a total scattering intensity is calculated.

$$C=I_C/(I_C+I_A)\times 100 \quad \text{(Calculation Method)}$$

wherein C is the crystallinity (%), $I_C$ is the scattering intensity attributable to the crystalline portion, and $I_A$ is the scattering intensity attributable to the amorphous portion.

The resin composition extruded from the extruder is pelletized, for example, by a strand cutting method in which strands formed by cooling and solidifying the heat-melted and extruded resin composition are cut to a predetermined size by means of a strand cutter to produce cylindrical pellets of the EVOH resin composition, or an underwater cutting method or a hot cutting method in which the resin composition heat-melted in the extruder is extruded into a solidification liquid from the extrusion port and cut to a predetermined size in the melted state by means of a cutter to produce spherical pellets of the EVOH resin composition by utilizing surface tension occurring when the EVOH resin composition is solidified.

According to the use purpose of the resin composition, various additives such as a plasticizer, a heat stabilizer, a light stabilizer, a UV absorber, an anti-aging agent, a pigment, a colorant, natural fibers, inorganic particles, fillers, an antistatic agent, a releasing agent, a fragrance agent, a lubricant, a crosslinking (vulcanizing) agent, a crosslinking (vulcanization) accelerating agent, a nucleating agent, a nucleation accelerating agent, a flame retardant, a blowing agent, a softening agent, an antiseptic agent and an antibacterial/antifungal agent may be added to the ingredients in the mixing or the kneading of the ingredients in the production of the resin composition by the inventive production method, or to the resin composition produced by the inventive production method in the forming/molding of the resin composition.

The resin composition produced by the inventive production method is used for versatile formed/molded product applications, and can be formed/molded into various products such as a film, a sheet, a container, fibers, a rod and a pipe by the melt-forming/molding process. Further, the products may be pulverized (recycled) and melt-formed/molded again for reuse. Examples of the melt-forming/molding process include extrusion processes (T-die extrusion, inflation extrusion, blow-molding, melt-spinning, profile extrusion and the like), and injection-molding processes. A temperature for the melt-forming/molding process is generally selected from a range of 150° C. to 300° C.

The resin composition produced by the inventive production method may be used for single-component formed/molded products or for multilayer formed products. More specifically, the resin composition is useful in the form of a multilayer laminate including a layer of the resin composition and a layer of a thermoplastic resin or the like provided on at least one surface of the resin composition layer. Exemplary methods for stacking a base material layer on one or both surfaces of the resin composition layer for the production of the laminate include a method in which a thermoplastic resin is melt-extruded onto a film or a sheet of the resin composition, a method in which the resin composition is melt-extruded onto a base material such as a thermoplastic resin, a method in which the resin composition and other thermoplastic resin are coextruded, and a method in which a film or a sheet of the inventive resin composition and a film or a sheet of other base material are dry-laminated together with the use of an adhesive agent such as of an organic titanium compound, an isocyanate compound, a polyester compound or a polyurethane compound. It is also preferred to use the resin composition produced by the inventive production method for the coextrusion.

Examples of a resin to be used in combination with the resin composition for the coextrusion include a polyolefin resin, a polyester resin, a polyamide resin, a polyamide copolymer, a polystyrene resin, a polyvinyl chloride resin, a polyvinylidene chloride, an acryl resin, a vinyl ester resin, a polyester elastomer, a polyurethane elastomer, a chlorinated polyethylene, a chlorinated polypropylene, an aromatic or aliphatic polyketone and an aliphatic polyalcohol, among which the polyolefin resin is preferably used.

Specific examples of the polyolefin resin include: olefin homopolymers and copolymers such as linear low-density polyethylenes (LLDPE), low-density polyethylenes (LDPE), very-low-density polyethylenes (VLDPE), medium-density polyethylenes (MDPE), high-density polyethylenes (HDPE), ethylene-vinyl acetate copolymers (EVA), ionomers, ethylene-propylene (block or random) copolymers, ethylene-acrylic acid copolymers, ethylene-acrylate copolymers, ethylene-methacrylic acid copolymers, ethylene-methacrylate copolymers, polypropylenes, propylene-$\alpha$-olefin (C4 to C20 $\alpha$-olefin) copolymers, polybutenes, polypentenes and polymethylpentenes; and polyolefin resins in a broader sense, such as products obtained by graft-modifying any of these olefin homopolymers and copolymers with an unsaturated carboxylic acid or a carboxylate, and blends of any of these polyolefin resins, among which the linear low-density polyethylenes (LLDPE), the low-density polyethylenes (LDPE), the very-low-density polyethylenes (VLDPE), the ethylene-vinyl acetate copolymers (EVA) and the ionomers are preferred for excellent flexural fatigue resistance and vibration fatigue resistance of the resulting laminate packaging materials.

Where a film, a sheet or the like is first formed from the resin composition produced by the inventive production method and then extrusion-coated with other base material, or where a film, a sheet or the like formed from the resin composition produced by the inventive production method and a film, a sheet or the like of other base material are laminated together with the use of the adhesive agent, usable examples of the base material other than the thermoplastic resin include paper, a metal foil, an unstretched or uniaxially or biaxially stretched plastic film or sheet, a film or a sheet on which an inorganic compound is vapor-deposited, a woven fabric, a nonwoven fabric, a metal fiber material and a wood material.

Where layers a (a1, a2, . . . ) of the resin composition produced by the inventive production method and layers b (b1, b2, . . . ) of the thermoplastic resin or other base material are stacked to form a laminate for a film, a sheet or a bottle, for example, the layered structure of the laminate is not limited to a double layer structure a/b, but may be any combination of these layers, e.g., b/a/b, a/b/a, a1/a2/b, a/b1/b2, b2/b1/a/b1/b2, b1/b2/a/b3/b4, a1/b1/a2/b2 or the like. For a filament, possible composite structures include a bimetal-like structure, and sheath-core structures such as a b-a type, an a-b type and an eccentric sheath-core type.

As required, an adhesive resin layer may be provided between the layers of the aforementioned layered structure. Various adhesive resins are usable for the adhesive resin layer. The adhesive resin to be used cannot be unconditionally specified, but depends on the type of the resin for the layer b. Examples of the adhesive resin include olefin polymers modified as containing a carboxyl group by chemically bonding an unsaturated carboxylic acid or its anhydride to the olefin polymers (the aforementioned polyolefin resins in a broader sense) by an addition reaction or a graft reaction. Specific preferred examples of the adhesive resin include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride and ethylene-vinyl acetate copolymers graft-modified with maleic anhydride, which may be used alone or in combination as a mixture.

In this case, the proportion of the unsaturated carboxylic acid or its anhydride to be contained in such an olefin polymer is preferably 0.001 to 3 weight %, more preferably 0.01 to 1 weight %, particularly preferably 0.03 to 0.5 weight %. If the modification degree of the modification product is smaller, the adhesiveness will be insufficient. If the modification degree is greater, on the other hand, a crosslinking reaction will occur, thereby reducing the formability. Further, the resin composition produced by the inventive production method, other EVOH resin, a rubber or elastomer such as a polyisobutylene or an ethylene propylene rubber, or the resin for the layer b may be blended with the adhesive resin. Particularly, the adhesiveness can be advantageously improved by blending a polyolefin resin different from the base polyolefin resin for the adhesive resin.

The thicknesses of the respective layers of the laminate cannot be unconditionally specified, but depend on the layered structure, the type of the layer b, the use purpose, the container shape and the required physical properties. Typically, the thickness of the layer a is selected from a range of 0.5 to 300 μm (further 1 to 200 μm), and the thickness of the layer b is selected from a range of 5 to 3000 μm (further 10 to 2000 μm). The thickness of the adhesive resin layer is selected from a range of 0.5 to 300 μm (further 1 to 200 μm). If the layer a is excessively thin, the gas barrier property will be reduced, and the thickness control will be unstable. On the other hand, an excessively great thickness of the layer a will reduce the flexural fatigue resistance, and will not be economically preferred. If the layer b is excessively thin, the rigidity will be reduced. On the other hand, an excessively great thickness of the layer b will reduce the flexural fatigue resistance and increase the weight and, therefore, will not be preferred. If the adhesive resin layer is excessively thin, the interlayer adhesiveness will be reduced, and the thickness control will be unstable. An excessively great thickness of the adhesive resin layer will increase the weight and will not be economically preferred. For improvement of the formability and the physical properties of the laminate, the additives described above, a modifying agent, a filler and other resin may be added to the materials for the respective layers of the laminate, as long as the effects of the disclosure are not impaired.

The laminate is used in various forms. It is preferred to perform a stretching process on the laminate for improvement of the physical properties of the laminate. The stretching process may be a uniaxial stretching process or a biaxial stretching process. The stretching ratio of the laminate is preferably as high as possible for physical properties. This makes it possible to produce a stretched film, a stretched sheet, a stretched container, a stretched bottle and other stretched formed products free from pinholes, cracking, uneven stretching and delamination which may otherwise occur during the stretching.

A roll stretching method, a tenter stretching method, a tubular stretching method or a stretch-blowing method may be employed for the stretching process. Further, a deep drawing process or a vacuum/pressure forming process having a higher stretching ratio may also be employed. A simultaneous biaxial stretching method or a sequential biaxial stretching method may be employed for the biaxial stretching process. The stretching temperature is selected from a range of 50° C. to 170° C., preferably about 60° C. to about 160° C.

It is also preferred to perform a heat-setting process after the completion of the stretching process. The heat-setting process may be performed by known means. The stretched film is typically heat-treated at 80° C. to 300° C., preferably 100° C. to 280° C., for about 1 to about 600 seconds while being kept in tension. Where a cup-shaped or tray-shaped multilayer container is produced from the multilayer sheet or film, for example, a draw-forming process is employed. More specifically, a vacuum forming method, a pressure forming method, a vacuum/pressure forming method or a plug-assisted vacuum/pressure forming method may be employed.

Where a tubular or bottle-shaped multilayer container is formed from a multilayer parison (a hollow tubular preform yet to be blown), a blowing process is employed. Specific examples of the blowing process include extrusion blow-molding methods (a double head method, a mold transfer method, a parison shift method, a rotary method, an accumulator method, a horizontal parison method and the like), a cold-parison blow-molding method, an injection blow-molding method, and biaxial-stretching blow-molding methods (an extrusion cold-parison biaxial-stretching blow-molding method, an injection cold-parison biaxial-stretching blow-molding method, an in-line injection biaxial-stretching blow-molding method and the like).

Where raw meat, processed meat, cheese or the like is to be packaged by a heat-shrink packaging method, the laminate not subjected to the heat-setting process after the stretching is used as a product film. The raw meat, the processed meat, the cheese or the like is wrapped with the film, which is in turn heat-treated typically at 50° C. to 130° C., preferably 70° C. to 120° C., for about 2 to about 300 seconds to be heat-shrunk for tight packaging.

The laminate thus produced may be used in a desired form. Exemplary forms include a film, a sheet, a tape, a bottle, a pipe, a filament and a profile extrusion product. As required, the laminate may be subjected to a heat treatment, a cooling process, a rolling process, a printing process, a dry laminating process, a solution or melt coating process, a bag making process, a deep drawing process, a box making process, a tube making process, a splitting process or the like.

Containers such as cups, trays, tubes and bottles produced in the aforementioned manner, and bags and caps formed of the stretched film are useful as containers for general foods, condiments such as mayonnaise and dressing, fermented foods such as miso, fat and oil such as salad oil, beverages, cosmetics, medicines, detergents, perfumes, industrial chemicals, agricultural chemicals, fuels and the like. Particularly, the inventive laminate is useful for heat-stretch-formed containers including cup-shaped containers for semisolid foods and condiments such as jelly, pudding, yogurt, mayonnaise and miso, and tray-shaped containers for raw meat, processed meat (ham, bacon, Vienna sausage and the like).

EXAMPLES

The present disclosure will hereinafter be described specifically by way of examples thereof. However, it should be understood that the present disclosure be not limited to the examples within the scope of the present disclosure.

It is noted that "parts" means "parts by weight" in the following examples.

Example 1

[Preparation of Aqueous Dispersion of Inorganic Compound (B)]

First, 20 parts of kaolin (Imerys DB-KOTE having an average particle diameter of 0.77 μm and a surface area of 10 B.E.T.m$^2$/g and not surface-treated) and 80 parts of distilled water were put in a container, and then stirred by means of a silicone whisk at a room temperature until the kaolin was deagglomerated. Thus, an aqueous dispersion of kaolin (having a solid concentration of 20%) was prepared.

[Production of EVOH Resin Composition]

First, 100 parts of an EVOH resin (A) having a water content of 0.2%, an ethylene content of 29 mol % and a saponification degree of 99.8 mol % was fed into a material feeding portion 1 of a twin screw extruder (having an L/D ratio of 56 and a diameter of 32 mm) having a screw construction I and including a dispersion press-injection portion 2, a screw-type side feeder 3 and a vacuum vent 4 as shown in FIGS. 1A and 1B, and then melted at a temperature of 230° C. Thereafter, 50 parts of the aqueous dispersion of the inorganic compound (kaolin) (B) (having a solid concentration of 20%) prepared in the aforementioned manner was continuously press-injected from the dispersion press-injection portion 2, and the resulting mixture was kneaded (slurry method). After the kneading, the resulting EVOH resin composition was extruded in a strand form into a water vessel, and the resulting strands were cut by means of a pelletizer. Thus, pellets of the EVOH resin composition having a crystallinity of 39.8% and a water content of 0.2% were produced. The crystallinity and the water content were measured by the aforementioned methods.

The screw-type side feeder 3 had an L/D ratio of 8.3 and a screw inner diameter of 28 mm. The screw-type side feeder 3 was used at a room temperature (25° C.) in an open air atmosphere. The rotation speed of the screw-type side feeder was 100 rpm.

With the use of the EVOH resin composition pellets thus produced, a multilayer film having a layered structure of PE/PE/EVOH/PE/PE (40/30/10/30/40 μm) was produced by means of an air-cooling inflation five-type five-layer film forming apparatus (extruder including a full-flight screw and having an L/D ratio of 28, a screw inner diameter of 40 mm and an extrusion temperature of 220° C.).

A polyethylene NovatecLL UF421 available from Japan Polyethylene Corporation was used as the PE. A drawing speed was 8 m/min.

[Evaluation for Gas Barrier Property]

The OTR (oxygen transmission rate) of the multilayer film thus produced was measured at 20° C. at an internal RH of 80% at an external RH of 80% by means of an oxygen gas transmission amount measurement apparatus (OX-TRAN 2/21 available from Mocon, Inc.)

The OTR improvement rate per 1% of kaolin was determined from the following expression:

$$I_{OTR} = (OTR_1 - OTR_2)/C_K$$

wherein $I_{OTR}$ is the OTR improvement rate per 1% of kaolin, $OTR_1$ is the OTR (cc.20 μm/m$^2$·day·atm) of the multilayer film produced in the aforementioned manner, $OTR_2$ is the OTR (cc.20 μm/m$^2$·day·atm) of a film formed of the EVOH resin (A) (a film formed in Reference Example 1 to be described later), and $C_K$ is the concentration (%) of kaolin in the resin composition.

[Evaluation for Kaolin Dispersibility]

A single-layer film of the EVOH resin (having a size of 10 cm (length)×10 cm (width)×10 μm (thickness)) was produced by separating the outer layers and the inner layers from the produced multilayer film. The number of agglomerates (each having a size of not less than 200 μm) of kaolin (inorganic compound) in the single-layer film was counted by means of a digital microscope (KH-1300 available from HIROX Co., Ltd.) Three such samples (three single-layer films) were prepared for the multilayer film, and an average agglomerate number for the three samples was determined and shown in Table 1. A smaller average indicates that the kaolin dispersibility is excellent.

Example 2

EVOH resin composition pellets were produced in substantially the same manner as in Example 1 (slurry method), except that kaolin (Imerys Amlok321 having an average particle diameter of 0.3 μm and a surface area of 22 to 26 B.E.T.m$^2$/g and surface-treated with aminosilane) was used as the inorganic compound (B), and the evaluation was performed in the same manner. The EVOH resin composition pellets thus produced had a crystallinity of 37.7% and a water content of 0.5%. The results are shown in Table 1.

Example 3

EVOH resin composition pellets were produced in substantially the same manner as in Example 1 (slurry method), except that kaolin (Imerys EckaliteED having an average particle diameter of 0.32 μm and a surface area of 21 B.E.T.m$^2$/g and not surface-treated) was used as the inorganic compound (B), and the evaluation was performed in the same manner. The EVOH resin composition pellets thus produced had a crystallinity of 40.0% and a water content of 0.3%. The results are shown in Table 1.

Example 4

EVOH resin composition pellets were produced in substantially the same manner as in Example 1 (slurry method), except that the twin screw extruder had the screw construction II shown in FIG. 2B instead of the screw construction I, and the evaluation was performed in the same manner. The EVOH resin composition pellets thus produced had a crystallinity of 38.8% and a water content of 0.2%. The retention time of the resin composition in the extruder was 220 seconds. The results are shown in Table 1.

Example 5

EVOH resin composition pellets were produced in substantially the same manner as in Example 1 (slurry method), except that the aqueous dispersion of the inorganic compound (B) had a solid concentration of 11%, and the evaluation was performed in the same manner. The EVOH resin composition pellets thus produced had a crystallinity of 37.8% and a water content of 0.2%. The results are shown in Table 1.

Comparative Example 1

An attempt was made to produce an EVOH resin composition in substantially the same manner as in Example 1 without the use of the screw-type side feeder 3, but the production was impossible. The results are shown in Table 1.

Comparative Example 2

An attempt was made to produce an EVOH resin composition in substantially the same manner as in Example 1 without the use of the screw-type side feeder 3 and the vacuum vent 4, but the production was impossible. The results are shown in Table 1.

Comparative Example 3

[Production of EVOH Resin Composition]

First, 88 parts of an EVOH resin (A) having a water content of 0.2%, an ethylene content of 29 mol % and a saponification degree of 99.8 mol % and 12 parts of kaolin (Imerys DB-KOTE having an average particle diameter of 0.77 μm and a surface area of 10 B.E.T.m$^2$/g and not surface-treated) were preliminarily blended together by a blender, whereby a premixture was prepared. Then, 100 parts of the premixture was fed into a material feeding portion 1 of a twin screw extruder (having an L/D ratio of 56 and a diameter of 32 mm) having a screw construction I and including a dispersion press-injection portion 2, a screw-type side feeder 3 and a vacuum vent 4 as shown in FIGS. 1A and 1B, and then kneaded at a temperature of 230° C. (dry blend method). After the kneading, the resulting EVOH resin composition was extruded in a strand form into a water vessel, and the resulting strands were cut by means of a pelletizer. Thus, pellets of the EVOH resin composition having a crystallinity of 35.7% and a water content of 0.2% were produced. The crystallinity and the water content were measured by the aforementioned methods.

The screw-type side feeder 3 had an L/D ratio of 8.3 and a screw inner diameter of 28 mm. The screw-type side feeder 3 was used at a room temperature (25° C.) in an open air atmosphere. The rotation speed of the screw-type side feeder was 100 rpm.

With the use of the EVOH resin composition pellets thus produced, the evaluation was performed in the same manner as in Example 1.

Comparative Example 4

EVOH resin composition pellets were produced in substantially the same manner as in Comparative Example 3 (dry blend method), except that kaolin (Imerys Amlok321 having an average particle diameter of 0.3 μm and a surface area of 22 to 26 B.E.T.m$^2$/g and surface-treated with aminosilane) was used, and the evaluation was performed in the same manner. The EVOH resin composition pellets thus produced had a crystallinity of 20.6% and a water content of 0.2 The results are shown in Table 1.

Comparative Example 5

EVOH resin composition pellets were produced in substantially the same manner as in Comparative Example 3 (dry blend method), except that kaolin (Imerys EckaliteED having an average particle diameter of 0.32 μm and a surface area of 21 B.E.T.m$^2$/g and not surface-treated) was used, and the evaluation was performed in the same manner. The EVOH resin composition pellets thus produced had a crystallinity of 31.4% and a water content of 0.2%. The results are shown in Table 1.

Reference Example 1

An EVOH resin film was prepared in substantially the same manner as in Example 1, except that the inorganic compound was not used, and the evaluation was performed in the same manner.

TABLE 1

| | Production method | Crystallinity (%) | Water content (weight %) | Dispersibility of kaolin (number) | OTR improvement rate per 1% of kaolin |
|---|---|---|---|---|---|
| Example 1 | Slurry | 39.8 | 0.2 | 0.3 | 4.4 |
| Example 2 | method | 37.7 | 0.5 | 0.3 | 4.8 |
| Example 3 | | 40.0 | 0.3 | 0 | 4.2 |
| Example 4 | | 38.8 | 0.2 | 0.3 | 4.6 |
| Example 5 | | 37.8 | 0.2 | 0.3 | 4.4 |
| Comparative Example 1 | (*1) | — | — | — | — |
| Comparative Example 2 | (*2) | — | — | — | — |
| Comparative Example 3 | Dry blend method | 35.7 | 0.2 | 5.7 | 2.8 |
| Comparative Example 4 | | 20.6 | 0.2 | 18.0 | 1.6 |
| Comparative Example 5 | | 31.4 | 0.2 | 17.3 | 1.9 |
| Reference Example 1 | Slurry method (*3) | 20.6 | 0.2 | 18.0 | — |

(*1) Production was impossible without the use of the screw-type side feeder.
(*2) Production was impossible without the use of the screw-type side feeder and the vacuum vent.
(*3) The EVOH resin containing no kaolin was used.

The above results indicate that, in Examples 1 to 5 which employed an extruder having an opening functioning to expel water vapor while preventing the backflow of the EVOH resin kneaded body, water was efficiently removed. Therefore, the EVOH resin compositions of Examples 1 to 5 each had a crystallinity of not lower than 36% and a water content of lower than 5%. Further, the films of Examples 1 to 5 respectively formed by using these EVOH resin compositions were excellent in inorganic compound dispersibility, and each had a higher gas barrier property improvement rate.

In Comparative Example 1, the EVOH resin composition extruded from the extruder had a higher water content, so that the sampling was impossible due to water bubbling.

In Comparative Example 2, water flowed back to the material feeding portion 1, so that the pellets adhered to each other to agglomerate. Therefore, stable feeding of the material and the sampling were impossible.

In Comparative Examples 3 to 5, the EVOH resin composition pellets had a crystallinity of lower than 36%. Further, the inorganic compound dispersibility was poorer, and the gas barrier property improvement rate was low.

While specific forms of the embodiment of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The EVOH resin composition produced by the inventive production method is usable for production of a film, a sheet, a container and the like, and is useful for packaging materials for general foods, retort foods, medicines, industrial chemicals, agricultural chemicals and the like.

REFERENCE SIGNS LIST

1: MATERIAL FEEDING PORTION
2: DISPERSION PRESSURE-INJECTION PORTION
3: SCREW-TYPE SIDE FEEDER
4: VACUUM VENT
5a, 5b, 5c, 5d, 5e: FULL-FLIGHT SCREW PORTIONS
6a, 6b, 6c: KNEADING PORTIONS
7a, 7b: SEAL RINGS (7a: SEAL RING FOR PREVENTION OF UPSTREAM BACKFLOW OF WATER, 7b: SEAL RING FOR DOWNSTREAM LEAKAGE OF WATER)

The invention claimed is:

1. A saponified ethylene-vinyl ester copolymer composition pellet comprising:
   (A) a saponified ethylene-vinyl ester copolymer; and
   (B) an inorganic compound;
   wherein the saponified ethylene-vinyl ester copolymer composition pellet has a water content of lower than 5 weight % and a crystallinity of not lower than 36%.

2. The saponified ethylene-vinyl ester copolymer composition pellet according to claim 1, wherein the inorganic compound (B) is present in a proportion of 0.1 to 100 parts by weight based on 100 parts by weight of the saponified ethylene-vinyl ester copolymer (A).

3. The saponified ethylene-vinyl ester copolymer composition pellet according to claim 1, wherein the inorganic compound (B) is a layered inorganic compound.

4. A saponified ethylene-vinyl ester copolymer composition pellet production method comprising the steps of:
   feeding a saponified ethylene-vinyl ester copolymer (A), an inorganic compound (B) and water (C) into a kneading apparatus including a screw side feeder; and
   driving the screw side feeder and melt-kneading the resulting saponified ethylene-vinyl ester copolymer mixture to expel water vapor from the screw side feeder to reduce the water content of the saponified ethylene-vinyl ester copolymer mixture to lower than 5 weight % while suppressing leakage of the saponified ethylene-vinyl ester copolymer kneaded body from the screw side feeder, whereby the saponified ethylene-vinyl ester copolymer composition pellet according to claim 1 having a crystallinity of not lower than 36% is prepared.

5. The saponified ethylene-vinyl ester copolymer composition pellet production method according to claim 4, wherein the inorganic compound (B) is a layered inorganic compound.

6. The saponified ethylene-vinyl ester copolymer composition pellet production method according to claim 4, wherein the screw side feeder is positioned downstream of a kneading portion of the kneading apparatus with respect to a material transport direction.

7. The saponified ethylene-vinyl ester copolymer composition pellet production method according to claim 6, wherein the kneading apparatus further includes water expeller provided downstream of the screw side feeder to expel water from the saponified ethylene-vinyl ester copolymer kneaded body.

8. The saponified ethylene-vinyl ester copolymer composition pellet production method according to claim 4, wherein the kneading apparatus further includes water expeller provided downstream of the screw side feeder to expel water from the saponified ethylene-vinyl ester copolymer kneaded body.

* * * * *